United States Patent
Obuchi

(10) Patent No.: US 8,483,924 B2
(45) Date of Patent: Jul. 9, 2013

(54) VEHICLE CONTROL SYSTEM, AND OPERATION DEVICE

(75) Inventor: Yutaka Obuchi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 69 days.

(21) Appl. No.: 13/382,718

(22) PCT Filed: Jul. 7, 2009

(86) PCT No.: PCT/JP2009/062370
§ 371 (c)(1),
(2), (4) Date: Jan. 6, 2012

(87) PCT Pub. No.: WO2011/004459
PCT Pub. Date: Jan. 13, 2011

(65) Prior Publication Data
US 2012/0109485 A1    May 3, 2012

(51) Int. Cl.
*B60W 40/12*    (2012.01)
(52) U.S. Cl.
USPC .............................................. 701/72; 701/79
(58) Field of Classification Search
USPC .............................. 701/70, 72, 74, 77, 79, 80
See application file for complete search history.

(56) References Cited

U.S. PATENT DOCUMENTS 8,306,697 B2 *  11/2012  Lu et al. .......................... 701/38
8,311,706 B2 *  11/2012  Lu et al. .......................... 701/38

FOREIGN PATENT DOCUMENTS

| JP | 11-083534 |   | 3/1999 |
|----|-----------|---|--------|
| JP | 11-304662 | A | 11/1999 |
| JP | 2000-292316 | A | 10/2000 |
| JP | 2004-203084 | A | 7/2004 |
| JP | 2006-076403 | A | 3/2006 |

OTHER PUBLICATIONS

Translation of International Preliminary Report on Patentability mailed Jan. 12, 2012 of PCT/JP2009/062370.
International Search Report mailed Oct. 27, 2009 of PCT/JP2009/062370.

* cited by examiner

*Primary Examiner* — Richard M. Camby
(74) *Attorney, Agent, or Firm* — Kenyon & Kenyon LLP

(57) ABSTRACT

A vehicle control device capable of obtaining the sufficient effect of vehicle control is provided. A vehicle control device 1 outputs a control signal to a vehicle on the basis of the height of the center of gravity based on the behavior of the vehicle at the time of rolling or pitching or the correlation value correlated with the height of the center of gravity, and the control signal is calculated on the basis of acceleration of the vehicle in which a rolling angle or a pitch angle is reflected. The operation device calculates the height of the center of gravity or the vehicle weight on the basis of acceleration of the vehicle in which the rolling angle or the pitch angle is reflected and calculates a control signal on the basis of the height of the center of gravity or the vehicle weight. Thus, since the vehicle control device 1 can calculate the control signal on the basis of the acceleration of the vehicle in which the rolling angle or the pitch angle is reflected, it is possible to perform accurate vehicle control according to the rolling angle or the pitch angle at the time of rolling or pitching of the vehicle.

2 Claims, 6 Drawing Sheets

(a)

(b)

VEHICLE CONTROL SYSTEM, AND OPERATION DEVICE

This is a 371 national phase application of PCT/JP2009/062370 filed 7 Jul. 2009, the contents of which are incorporated herein by reference.

TECHNICAL FIELD

The present invention relates to a vehicle control device which controls a vehicle and an operation device which calculates the height of the center of gravity of a vehicle and the correlation value.

BACKGROUND ART

As a conventional vehicle control device, a system which detects the rolling angle of a vehicle, lateral acceleration acting on the vehicle, and the weight of the vehicle and estimates the height of the center of gravity of the vehicle based on the equation of motion at the time of rolling on the basis of these items of the detected information is known (for example, Patent Literature 1). This vehicle control device can perform automatic deceleration control and the like by setting a threshold value for determination of rolling of the vehicle on the basis of the estimated height of the center of gravity, determining the driving conditions, such as lateral acceleration at the time of turning, according to the threshold value for determination, and outputting a control signal.

CITATION LIST

Patent Literature

[Patent Literature 1] Japanese Unexamined Patent Application Publication No. 11-83534

SUMMARY OF INVENTION

Technical Problem

Here, in the vehicle control device described above, there have been cases where the height of the center of gravity cannot be estimated with sufficient accuracy. Then, when outputting a control signal on the basis of the height of the center of gravity, the above-described vehicle control device may not output the control signal with sufficient accuracy and the effect of vehicle control may be insufficient accordingly. Therefore, for some time there has been a demand to improve the estimation accuracy of the height of the center of gravity, so that the sufficient effect of vehicle control can be obtained.

The present invention has been made to solve such a problem, and it is an object of the present invention to provide a vehicle control device capable of obtaining the sufficient effect of vehicle control and an operation device capable of estimating the height of the center of gravity or the correlation value correlated with the height of the center of gravity with sufficient accuracy.

Solution to Problem

A vehicle control device related to the present invention is a vehicle control device which outputs a control signal of a vehicle on the basis of a height of the center of gravity based on a behavior of the vehicle in a roll state or a pitch state or a correlation value correlated with the height of the center of gravity, and is characterized in that the control signal is calculated on the basis of acceleration of the vehicle in which a rolling angle or a pitch angle is reflected.

According to the vehicle control device related to the present invention, since the control signal can be calculated on the basis of the acceleration of the vehicle in which the rolling angle or the pitch angle is reflected, it is possible to perform accurate vehicle control according to the rolling angle or the pitch angle at the time of rolling or pitching of the vehicle. As a result, the sufficient effect of vehicle control can be obtained.

In addition, an operation device related to the present invention is an operation device which calculates a height of the center of gravity of a vehicle or a correlation value correlated with the height of the center of gravity, and is characterized in that the height of the center of gravity or the correlation value is calculated on the basis of acceleration of the vehicle in which a rolling angle or a pitch angle of the vehicle is reflected.

According to the operation device related to the present invention, since the height of the center of gravity or the correlation value can be calculated on the basis of the acceleration of the vehicle in which the rolling angle or the pitch angle is reflected, it is possible to calculate the height of the center of gravity or the correlation value with sufficient accuracy according to the rolling angle or the pitch angle at the time of rolling or pitching of the vehicle.

Advantageous Effects of Invention

According to the present invention, since the sufficient effect of vehicle control can be obtained, it is possible to estimate the height of the center of gravity or the correlation value correlated with the height of the center of gravity with sufficient accuracy.

DESCRIPTION OF EMBODIMENTS

Hereinafter, a preferred embodiment of a vehicle control device related to the present invention will be described in detail with reference to the drawings.

Figure 1:
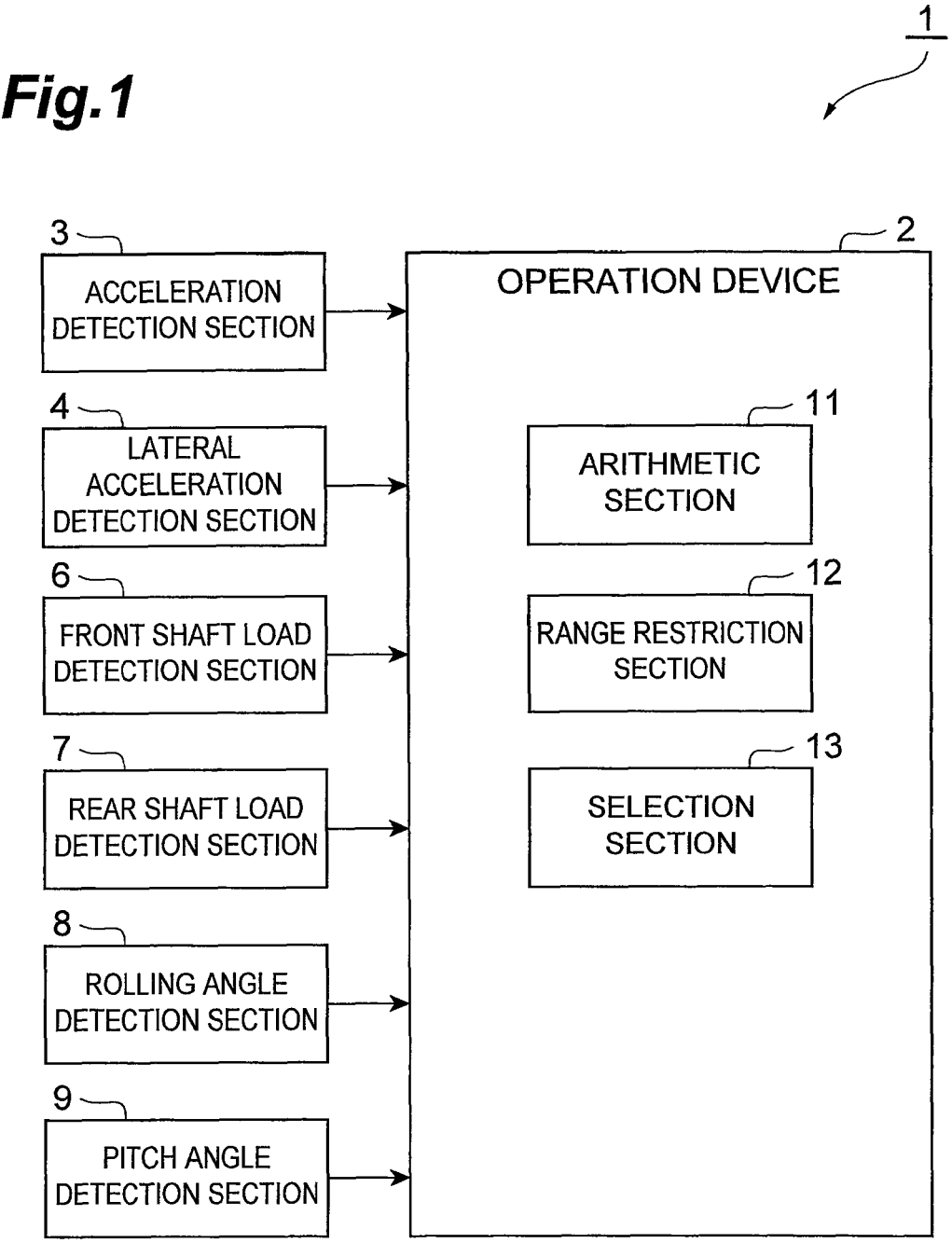
FIG. 1 is a diagram showing the block configuration of a vehicle control device according to an embodiment of the invention.

FIG. 1 is a diagram showing the block configuration of a vehicle control device 1 according to the embodiment of the invention. The vehicle control device 1 has a function of outputting a control signal to a vehicle on the basis of the height of the center of gravity and the vehicle weight (correlation value correlated with the height of the center of gravity) based on the behavior of the vehicle in a roll state or a pitch state. In addition, the vehicle control device 1 has a function of calculating a control signal on the basis of acceleration of a vehicle in which the rolling angle or the pitch angle is reflected. The vehicle control device 1 is configured to include an operation device 2, an acceleration detection section 3, a lateral acceleration detection section 4, a front shaft load detection section 6, a rear shaft load detection section 7, and a rolling angle detection section 8, and a pitch angle detection section 9.

The acceleration detection section 3 has a function of detecting the forward and backward acceleration of a vehicle and is constituted by, for example, an acceleration sensor for use in ABS or VSC. Alternatively, the acceleration detection section 3 may detect forward and backward acceleration on the basis of the wheel speed. The acceleration detection section 3 has a function of outputting the detected forward and backward acceleration of the vehicle to the operation device 2. The lateral acceleration detection section 4 has a function of detecting lateral acceleration of the vehicle and is constituted by a lateral acceleration sensor. The lateral acceleration detection section 4 has a function of outputting the detected lateral acceleration to the operation device 2.

The front shaft load detection section 6 has a function of detecting a load $F_f$ imposed on a front shaft FS of a vehicle M1 (see FIGS. 3 and 4) and is constituted by a pressure sensor or the like provided in the front shaft FS. The rear shaft load detection section 7 has a function of detecting a load $F_r$ imposed on a rear shaft RS of the vehicle M1 (see FIGS. 3 and 4) and is constituted by a pressure sensor or the like provided in the rear shaft RS. The front shaft load detection section 6 and the rear shaft load detection section 7 has a function of outputting the detected loads to the operation device 2.

The rolling angle detection section 8 has a function of detecting a rolling angle φ of the vehicle M1 and is constituted by a rolling angle sensor. The rolling angle detection section 8 may be shared with a sensor of a curtain airbag. The rolling angle detection section 8 has a function of outputting the detected rolling angle to the operation device 2. The pitch angle detection section 9 has a function of detecting the pitch angle of the vehicle M1, and is formed by a pitch angle sensor. The pitch angle detection section 9 has a function of outputting the detected pitch angle to the operation device 2.

The operation device 2 is an electronic control unit, such as an ECU (Electronic Control Unit) which controls the entire vehicle control device 1, and includes a CPU as a main component, a ROM, a RAM, an input signal circuit, an output signal circuit, and a power supply circuit, for example. In addition, the operation device 2 has a function of calculating the height of the center of gravity of the vehicle and the vehicle weight on the basis of acceleration of the vehicle in which the rolling angle or the pitch angle is reflected. The operation device 2 includes an arithmetic section 11, a range restriction section 12, and a selection section 13.

The arithmetic section 11 has a function of calculating a curve representing the product of the vehicle weight and the height of the center of gravity of the vehicle on the basis of the behavior of the vehicle. Specifically, when the vehicle is traveling on a flat road or a slope, the arithmetic section 11 has a function of calculating the product of the vehicle weight and the height of the center of gravity on the basis of the moment balance around the front wheel or rear wheel of the vehicle. When the vehicle turns at a predetermined lateral acceleration, the arithmetic section 11 has a function of calculating the product of the vehicle weight and the height of the center of gravity on the basis of the rolling moment balance or gravitational moment balance. In particular, in the present embodiment, the arithmetic section 11 can correct and calculate longitudinal acceleration, gravitational acceleration, and lateral acceleration according to the rolling angle or the pitch angle. In addition, the arithmetic section 11 has a function of calculating a control signal value for vehicle control on the basis of the value of the vehicle weight and the value of the height of the center of gravity selected by the selection section 13 and also outputting the control signal. As examples of the vehicle control, roll suppression control for suppressing the roll of a vehicle on the basis of the height of the center of gravity or fuel consumption prediction control for predicting fuel consumption on the basis of the vehicle weight may be mentioned.

The range restriction section 12 has a function of superimposing a line, which represents the relationship between the vehicle weight and the height of the center of gravity and is set in advance on the basis of the specification of the vehicle, on a curve calculated by the arithmetic section 11 to restrict the range of the vehicle weight and the height of the center of gravity. The details of a method of restricting the range in the range restriction section 12 will be described below.

The selection section 13 has a function of selecting the value of the vehicle weight and the value of the height of the center of gravity from the range restricted by the range restriction section 12. The selection section 13 has a function of selecting a value greater than an intermediate value of the vehicle weight in the range restricted by the range restriction section 12 as the value of the vehicle weight and selecting a value greater than an intermediate value of the height of the center of gravity in the range restricted by the range restriction section 12 as the value of the height of the center of gravity. The selection section 13 selects the value of the vehicle weight at a boundary position of the range restricted by the range restriction section 12 as the value of the vehicle weight and selecting the value of the height of the center of gravity at a boundary position of the range restricted by the range restriction section 12 as the value of the height of the center of gravity.

Figure 2:
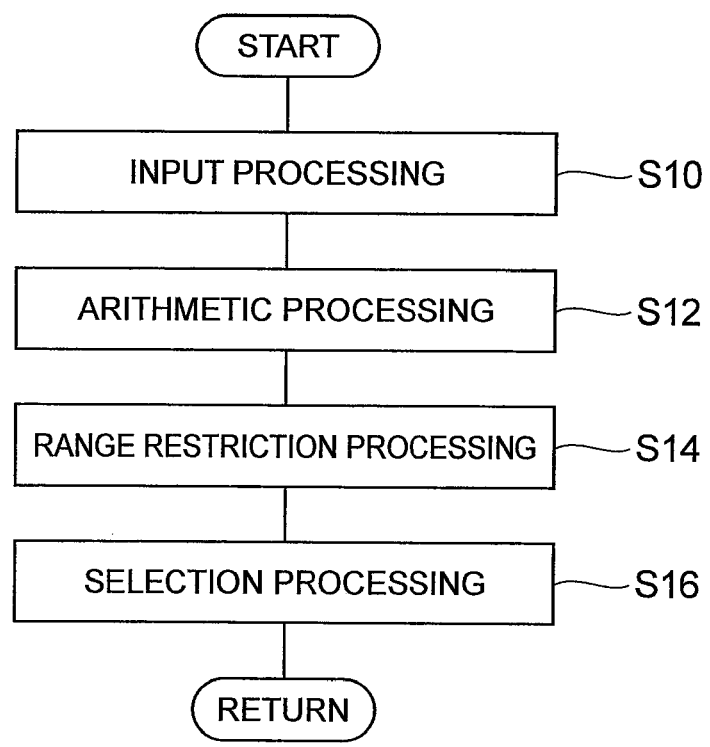
FIG. 2 is a flowchart showing control processing in the vehicle control device according to the embodiment of the invention.
Figure 3:
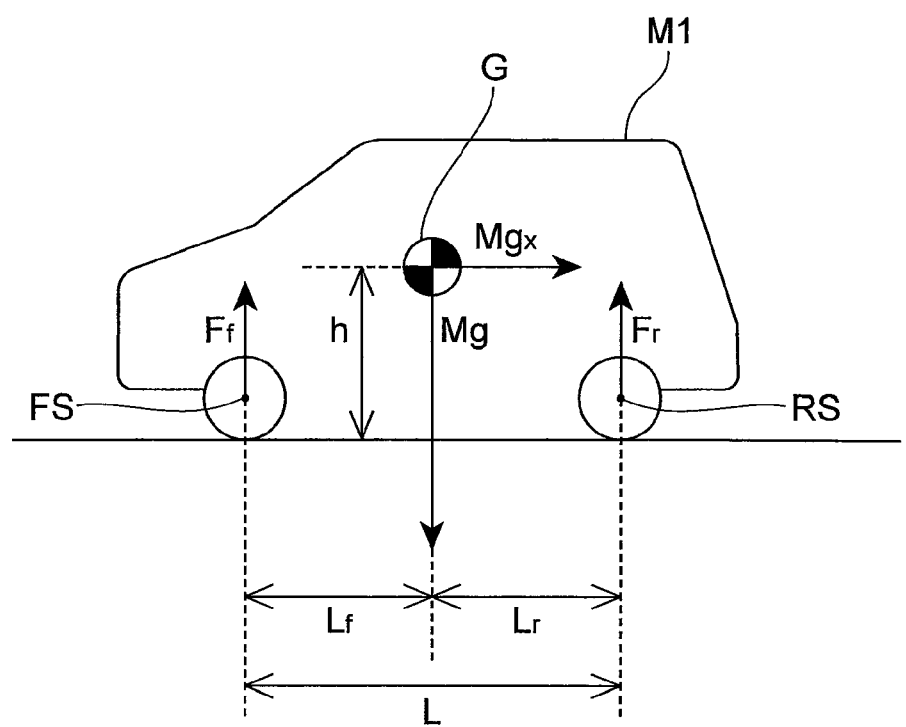
FIG. 3 is a diagram when a vehicle is viewed laterally and is a diagram showing acceleration or load applied to a vehicle.
Figure 4:
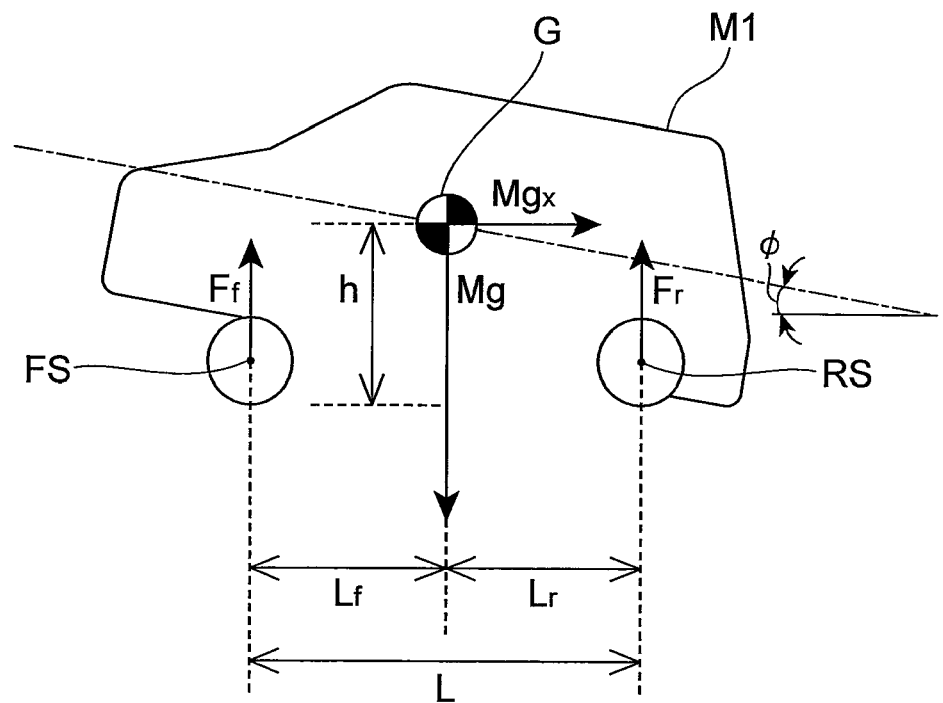
FIG. 4 is a diagram when a vehicle in a pitch state is viewed laterally and is a diagram showing acceleration or load applied to the vehicle.
Figure 4:
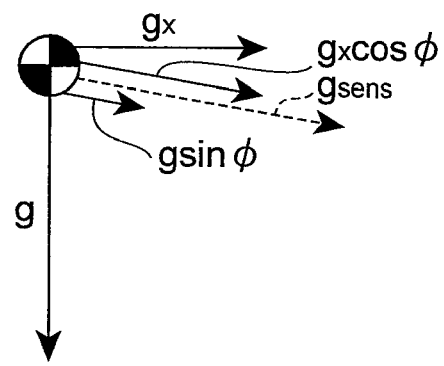
Figure 5:
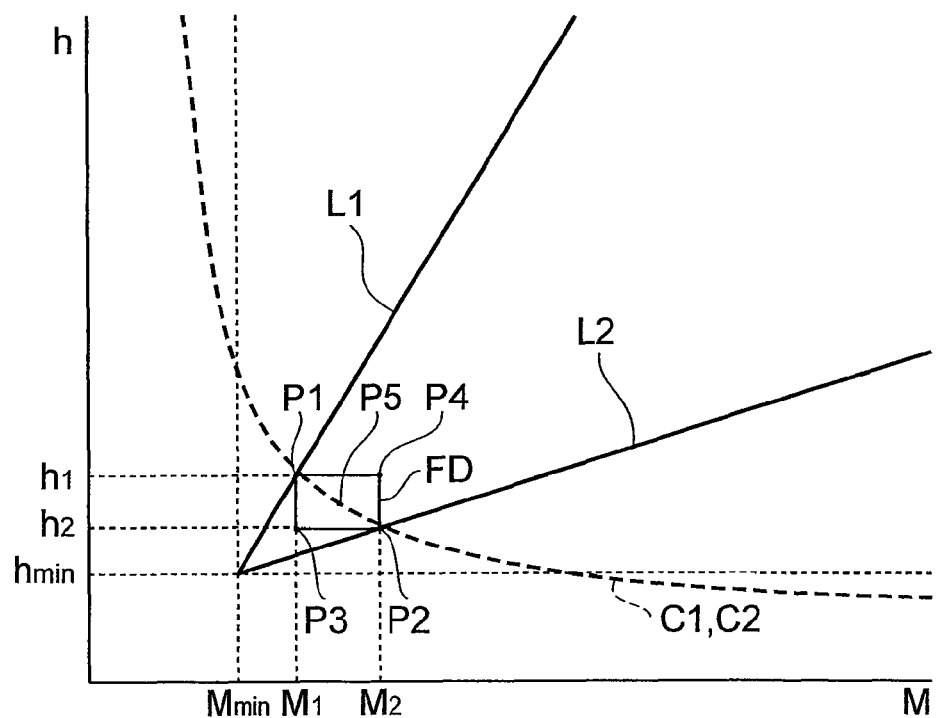
FIG. 5 is a graph for use in restricting the range of the vehicle weight and the height of the center of gravity of the vehicle.
Figure 6:
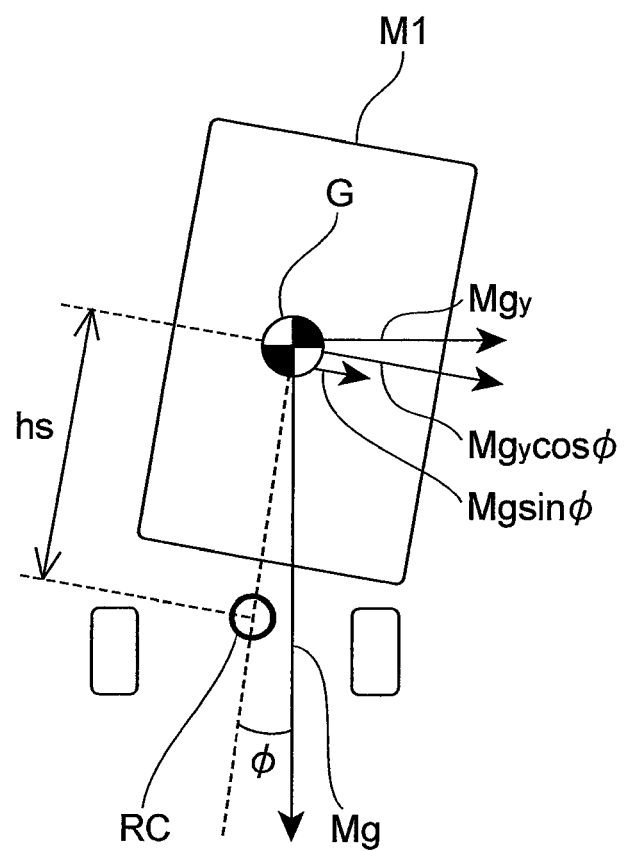
FIG. 6 is a diagram when a vehicle which is turning is viewed from the front and is a diagram showing acceleration applied to the vehicle.

Next, the operation of the vehicle control device 1 according to the embodiment of the invention will be described with reference to FIGS. 2 to 6. FIG. 2 is a flowchart showing control processing in the vehicle control device 1 of this embodiment. FIG. 3 is a diagram when the vehicle M1 is viewed laterally and is a diagram showing acceleration or load applied to the vehicle M1. FIG. 4 is a diagram when a vehicle M1 in a pitch state is viewed laterally and is a diagram showing acceleration or load applied to the vehicle M1. FIG. 5 is a graph for use in restricting the range of the vehicle weight and the height of the center of gravity of the vehicle M1. FIG. 6 is a diagram when the vehicle M1 which is turning is viewed from the front side and is a diagram showing acceleration applied to the vehicle M1.

First, with reference to FIGS. 2, 3, 4, and 5, description will be provided as to control processing in a case where the moment balance around the front wheel is calculated to estimate the vehicle weight and the height of the center of gravity of the vehicle M1 during traveling on a flat road. In FIGS. 3 and 4, M represents the vehicle weight of the vehicle M1, h represents the height of the center G of gravity of the vehicle M1 based on the ground, L represents the wheel base of the vehicle M1, $L_f$ represents the distance between the front shaft FS of the vehicle M1 and the center G of gravity in a horizontal direction, and $L_r$ represents the distance between the rear shaft RS of the vehicle M1 to the center G of gravity in the horizontal direction. $F_f$ represents a load imposed on the front shaft FS, $F_r$ represents a load imposed on the rear shaft RS, $g_x$ represents forward and backward acceleration, and g represents gravity acceleration.

First, the arithmetic section 11 receives respective values from the acceleration detection section 3, the lateral acceleration detection section 4, the front shaft load detection section 6, the rear shaft load detection section 7, the rolling angle detection section 8, and the pitch angle detection section 9 (Step S10). In the processing of S10, forward and backward acceleration $g_x$, a front shaft load $F_f$, a rear shaft load $F_r$, lateral acceleration $g_y$, a rolling angle, and a pitch angle are input, and forward and backward acceleration $g_x'$, a front shaft load $F_f'$, a rear shaft load $F_r'$, a lateral acceleration $g_y'$ a rolling angle, and a pitch angle after a predetermined time has elapsed are also sequentially input. Next, the arithmetic section 11 calculates an expression representing the product (M·h) of the vehicle weight M and the height h of the center of gravity on the basis of the expression of the moment balance around the front wheel (Step S12). Here, an expression in the situation shown in FIG. 4, which is a pitch state, is calculated after calculating the expression showing the product (M·h) in the situation shown in FIG. 3, which is not a pitch state. Specifically, the arithmetic section 11 acquires Expression (1) of the moment balance around the front wheel in the situation shown in FIG. 3. When the forward and backward acceleration is changed to $g_x'$ and the rear shaft load becomes $F_r'$, similarly to Expression (1), the arithmetic section 11 acquires Expression (2) of the moment balance. Next, the arithmetic section 11 subtracts Expression (2) from Expression (1) to obtain Expression (3). The arithmetic section 11 modifies Expression (3) to obtain Expression (4) representing the product (M·h) of the vehicle weight M and the height h of the center of gravity.

$$F_r \cdot L = M \cdot g \cdot L_f + M \cdot g_x \cdot h \quad \text{Expression (1)}$$

$$F_r' \cdot L = M \cdot g \cdot L_f + M \cdot g_x' \cdot h \quad \text{Expression (2)}$$

$$(F_r - F_r') L = M \cdot h (g_x - g_x') \quad \text{Expression (3)}$$

$$M \cdot h = (F_r - F_r') L / (g_x - g_x') \quad \text{Expression (4)}$$

Then, when the vehicle M1 pitches at the pitch angle $\phi$ as shown in FIG. 4A, the arithmetic section 11 reflects an influence of the pitch angle on each acceleration component. That is, since a vehicle longitudinal-axis direction component of the gravitational acceleration g and a vehicle longitudinal-axis direction component of the longitudinal acceleration $g_x$ are reflected on the measurement value which can be detected by the acceleration detection section 3 at the time of pitching, the arithmetic section 11 performs an operation by correcting the longitudinal acceleration according to the pitch angle. Specifically, as shown in FIG. 4B, since a measurement value $g_{sens}$ of the acceleration detection section 3 is a sum of a vehicle longitudinal-axis direction component $g \cdot \sin \phi$ of the gravitational acceleration g and a vehicle longitudinal-axis direction component $g_x \cdot \cos \phi$ of the longitudinal acceleration $g_x$, specifically, the measurement value $g_{sens}$ is expressed as Expression (5). Therefore, the arithmetic section 11 acquires Expression (6) as an expression showing the longitudinal acceleration $g_x$. In addition, the arithmetic section 11 acquires Expression (7) when the longitudinal acceleration changes to $g_x'$ and the pitch angle changes from $\phi$ to $\phi'$. The arithmetic section 11 acquires Expressions (8) and (9) by applying Expression (7) to Expression (3) and (4) described above. As a result, a curve C1 showing the product of the vehicle weight M and the height of the center of gravity h as shown in FIG. 5 is acquired.

$$g_{sens} = (g_x \cdot \cos \phi + g \cdot \sin \phi) \quad \text{Expression (5)}$$

$$g_x = (g_{sens} - g \cdot \sin \phi / \cos \phi) \quad \text{Expression (6)}$$

$$g_x - g_x' = (g_{sens}' - g \cdot \sin \phi / \cos \phi - (g_{sens} - g \cdot \sin \phi) / \cos \phi \quad \text{Expression (7)}$$

$$(F_r - F_r') L = M \cdot h \{ (g_{sens}' - g \cdot \sin \phi / \cos \phi - (g_{sens} - g \cdot \sin \phi) / \cos \phi \} \quad \text{Expression (8)}$$

$$M \cdot h = (F_r - F_r') L / \{ (g_{sens}' - g \cdot \sin \phi / \cos \phi - (g_{sens} - g \cdot \sin \phi) / \cos \phi \} \quad \text{Expression (9)}$$

The range restriction section 12 restricts the range FD of the vehicle weight M and the height h of the center of gravity (Step S14). Specifically, the range restriction section 12 superimposes lines L1 and L2 on the curve C1 on a graph shown in FIG. 5 to restrict the range FD of the vehicle weight M and the height h of the center of gravity. In the graph shown in FIG. 5, the horizontal axis represents the vehicle weight M and the vertical axis represents the height h of the center of gravity. The lines L1 and L2 are set in advance on the basis of the specification of the vehicle M1 and represent the relationship between the vehicle weight M and the height h of the center of gravity. The line L1 is set in advance by plotting the putative maximum height of the center of gravity with respect to a predetermined vehicle weight M for each vehicle weight M. The line L2 is set in advance by plotting the putative minimum height of the center of gravity with respect to a predetermined vehicle weight M for each vehicle weight M. When the minimum vehicle weight is $M_{min}$ and the minimum height of the center of gravity is $h_{min}$, all the lines L1 and L2 pass through the coordinate $(M_{min}, h_{min})$, and the inclination of the L1 is set to be greater than that of the line L2.

The range restriction section 12 superimposes the lines L1 and L2 on the curve C1 acquired in S12 to acquire a vehicle weight $M_1$ and height $h_1$ of the center of gravity at an intersection P1 between the curve C1 and the line L1 and to acquire a vehicle weight $M_2$ and height $h_2$ of the center of gravity at an intersection P2 between the curve C1 and the line L2. Next, the range restriction section 12 sets a coordinate point P3 at the position of the coordinate $(M_1, h_2)$ and sets a coordinate point P4 at the position of the coordinate $(M_2, h_1)$. Thus, the range restriction section 12 restricts a rectangular region with the apexes P1 $(M_1, h_1)$, P2 $(M_2, h_2)$, P3 $(M_1, h_2)$, and P4 $(M_2, h_1)$ as the range FD of the vehicle weight M and the height h of the center of gravity.

The selection section 13 selects the value of the vehicle weight M and the value of the height h of the center of gravity from the range FD restricted in S14 (Step S16). Although the selection section 13 selects an arbitrary value of the vehicle weight and an arbitrary value of the height of the center of gravity from the range FD, the selection section 13 preferably selects each value so that the strict conditions are set when performing control for suppressing the rolling of a vehicle or when performing control for prediction of fuel consumption. In the control for suppressing the rolling of a vehicle, stricter conditions are set as the height of the center of gravity h of a vehicle becomes larger. In the control for prediction of fuel consumption, stricter conditions are set as the vehicle weight M becomes larger. Thus, the selection section 13 selects $M_2$, which is a value at a boundary position of the range FD, as the vehicle weight M and selects $h_1$, which is a value at a boundary position of the range FD, as the height h of the center of gravity (that is, selects a value at P4). In particular, preferably, instead of $(M_2, h_1)$ which is the value at the boundary position, the selection section 13 may select a value greater than $(M_1 + M_2)/2$, which is an intermediate value of the vehicle weight in the range FD, as the value of the vehicle weight M and may select a value greater than $(h_1 + h_2)/2$, which is an intermediate value of the height of the center of gravity in the range FD, as the value of the height h of the center of gravity. A coordinate point P5 represented by the coordinate $((M_1+M_2)/2, (h_1+h_2)/2)$ is the central point of the range FD.

After the processing of S16 ends, the arithmetic section 11 calculates a control signal value for vehicle control on the basis of the value of the vehicle weight and the value of the height of the center of gravity selected in S16 and also outputs the control signal. When the control signal is output, the control processing shown in FIG. 2 ends, and the processing from S10 is started again.

Next, with reference to FIGS. 2, 5, and 6, description will be provided as to control processing in a case where, when the vehicle M1 is turning at lateral acceleration $g_y$, the vehicle weight and the height of the center of gravity are estimated. In this control processing, input processing of S10, range restriction processing of S14, and selection processing of S16 are same as those in the control processing of the moment balance around the front wheel when the vehicle M1 is traveling on a flat road, thus only arithmetic processing of S12 will be described. In FIG. 6, M represents the vehicle weight of the vehicle M1, hs represents the distance between a rolling center RC and the center G of gravity of the vehicle M1, $\phi$ represents a rolling angle, $g_y$ represents lateral acceleration, and g represents gravity acceleration. In this processing, hs becomes "the height of the center of gravity". In FIG. 5, the height h of the center of gravity is substituted with the height hs of the center of gravity.

The arithmetic section 11 calculates an expression representing the product (M·hs) of the vehicle weight M and the height hs of the center of gravity (Step S12). Specifically, the arithmetic section 11 corrects each acceleration component on the basis of the rolling angle so that the influence of the rolling angle is reflected on the lateral acceleration $g_y$ and the gravitational acceleration g. Accordingly, the arithmetic section 11 expresses the rolling moment due to inertial force acting on the vehicle M1 as $M \cdot g_y \cdot \cos\phi \cdot hs$ and expresses the rolling moment due to gravity caused by the inclination of the vehicle M1 as $M \cdot g \cdot \sin\phi \cdot hs$. Thus, if rolling rigidity is $K_\phi$, the arithmetic section 11 acquires Expression (10). If a lateral acceleration sensor serving as the lateral acceleration detection section 4 is attached to a rolling place of the vehicle M1, the detected lateral acceleration $g_{ysens}$ is represented by Expression (11). The arithmetic section 11 modifies Expression (10) to acquire Expression (12) and Expression (13). Thus, as shown in FIG. 5, a curve C2 is obtained which represents the product of the vehicle weight M and the height hs of the center of gravity.

$$K_\phi \cdot \phi = M \cdot g_y \cdot \cos\phi hs + M \cdot g \cdot \sin\phi hs \qquad \text{Expression (10)}$$

$$g_{ysens} = g_y \cdot \cos\phi + g \cdot \sin\phi \qquad \text{Expression (11)}$$

$$K_\phi \cdot \phi = M \cdot hs(g_y \cdot \cos\phi + g \cdot \sin\phi) \qquad \text{Expression (12)}$$

$$M \cdot hs = K_\phi \phi / g_{ysens} \qquad \text{Expression (13)}$$

As described above, according to the vehicle control device 1 related to the present embodiment, the operation device 2 calculates the height of the center of gravity or the vehicle weight on the basis of acceleration of the vehicle in which the rolling angle or the pitch angle is reflected and calculates a control signal on the basis of the height of the center of gravity or the vehicle weight. Thus, since the vehicle control device 1 can calculate the control signal on the basis of the acceleration of the vehicle in which the rolling angle or the pitch angle is reflected, it is possible to perform accurate vehicle control according to the rolling angle or the pitch angle at the time of rolling or pitching of the vehicle. As a result, the sufficient effect of vehicle control can be obtained.

In addition, since the operation device 2 related to the present embodiment can calculate the height of the center of gravity or the vehicle weight, which is the correlation value, on the basis of the acceleration of the vehicle in which the rolling angle or the pitch angle is reflected, it is possible to calculate the height of the center of gravity or the vehicle weight with sufficient accuracy according to the rolling angle or the pitch angle at the time of rolling or pitching of the vehicle.

The present invention is not limited to the embodiment described above. For example, in the embodiment described above, the vehicle control device 1 includes all of the acceleration detection section 3, the lateral acceleration detection section 4, the front shaft load detection section 6, the rear shaft load detection section 7, the rolling angle detection section 8, and the pitch angle detection section 9, and both the vehicle control according to the rolling angle and the vehicle control according to the pitch angle could be performed. However, the vehicle control device may perform only vehicle control according to the rolling angle or only vehicle control according to the pitch angle, for example.

Although in FIG. 4, a case has been described where all the curves C1 to C5 are the same curve, the curves may differ depending on acceleration, load, lateral acceleration, rolling angle, and pitch angle.

INDUSTRIAL APPLICABILITY

The invention can be used in estimating vehicle weight and height of the center of gravity and performing vehicle control.

REFERENCE SIGNS LIST

1: vehicle control device
2: operation device
M1: vehicle
M: vehicle weight (correlation value correlated with the height of the center of gravity)
h, hs: height of the center of gravity

The invention claimed is:

1. A vehicle control device which outputs a control signal of a vehicle on the basis of a height of the center of gravity based on a behavior of the vehicle in a roll state or a pitch state or a correlation value correlated with the height of the center of gravity, comprising:

an arithmetic unit which calculates a curve representing a product of a vehicle weight and a height of a center of gravity of a vehicle on the basis of behavior of the vehicle;
a range restriction unit which superimposes the curve on a line representing a relationship between the vehicle weight and the height of the center of gravity set in advance for the vehicle to restrict the range of the vehicle weight and the height of the center of gravity; and
a selection unit which selects the value of the vehicle weight and the value of the height of the center of gravity from the range restricted by the range restriction unit,
wherein the control signal is calculated on the basis of acceleration of the vehicle in which a rolling angle or a pitch angle is reflected.

2. An operation device which calculates a height of the center of gravity of a vehicle or a correlation value correlated with the height of the center of gravity, comprising:

an arithmetic unit which calculates a curve representing a product of a vehicle weight and a height of a center of gravity of a vehicle on the basis of behavior of the vehicle;
a range restriction unit which superimposes the curve on a line representing a relationship between the vehicle weight and the height of the center of gravity set in advance for the vehicle to restrict the range of the vehicle weight and the height of the center of gravity; and a selection unit which selects the value of the vehicle weight and the value of the height of the center of gravity from the range restricted by the range restriction unit, wherein the height of the center of gravity or the correlation value is calculated on the basis of acceleration of the vehicle in which a rolling angle or a pitch angle of the vehicle is reflected.

* * * * *

UNITED STATES PATENT AND TRADEMARK OFFICE
CERTIFICATE OF CORRECTION

PATENT NO. : 8,483,924 B2
APPLICATION NO. : 13/382718
DATED : July 9, 2013
INVENTOR(S) : Yutaka Obuchi It is certified that error appears in the above-identified patent and that said Letters Patent is hereby corrected as shown below:

In the Specification

Column 5, line 67, Expression 6, change "$g_x = (g_{sens} - g \cdot \sin \phi / \cos \phi)$" to -- $g_x = (g_{sens} - g \cdot \sin \phi)/\cos \phi$ --

Column 6, line 1, Expression 7, change "$g_x - g_x' = (g_{sens}' - g \cdot \sin\phi/\cos\phi - (g_{sens} - g \cdot \sin\phi)/\cos\phi$" to -- $g_x - g_x' = (g_{sens}' - g \cdot \sin\phi')/\cos\phi' - (g_{sens} - g \cdot \sin\phi)/\cos\phi$ --

Column 6, line 3, Expression 8, change "$(F_r - F_r')L = M \cdot h\{(g_{sens}' - g \cdot \sin\phi/\cos\phi - (g_{sens} - g \cdot \sin\phi)/\cos\phi\}$" to -- $(F_r - F_r')L = M \cdot h\{(g_{sens}' - g \cdot \sin\phi')/\cos\phi' - (g_{sens} - g \cdot \sin\phi)/\cos\phi\}$ --

Column 6, line 5, Expression 9, change "$M \cdot h = (F_r - F_r')L/\{(g_{sens}' - g \cdot \sin\phi/\cos\phi - (g_{sens} - g \cdot \sin\phi)/\cos\phi\}$" to -- $M \cdot h = (F_r - F_r')L/\{(g_{sens}' - g \cdot \sin\phi')/\cos\phi' - (g_{sens} - g \cdot \sin\phi)/\cos\phi\}$ --

Column 7, line 46, Expression 10, change "$K_\phi \cdot \phi = M \cdot g_y \cdot \cos\phi hs + M \cdot g \cdot \sin \phi hs$" to -- $K_\phi \cdot \phi = M \cdot g_y \cdot \cos\phi \cdot hs + M \cdot g \cdot \sin\phi \cdot hs$ --

Column 7, line 52, Expression 13, change "$M \cdot hs = K_\phi \phi / g_{ysens}$" to -- $M \cdot hs = K_\phi \cdot \phi / g_{ysens}$ --

Signed and Sealed this
Twenty-second Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO.        : 8,483,924 B2
APPLICATION NO.   : 13/382718
DATED             : July 9, 2013
INVENTOR(S)       : Yutaka Obuchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 67 days.

Signed and Sealed this
Eighth Day of September, 2015

Michelle K. Lee
*Director of the United States Patent and Trademark Office*